(12) United States Patent
Galbraith

(10) Patent No.: US 7,079,924 B2
(45) Date of Patent: Jul. 18, 2006

(54) VISION-BASED OBSTACLE AVOIDANCE

(75) Inventor: John Galbraith, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 299 days.

(21) Appl. No.: 10/689,924

(22) Filed: Oct. 17, 2003

(65) Prior Publication Data

US 2004/0093122 A1 May 13, 2004

Related U.S. Application Data

(60) Provisional application No. 60/424,596, filed on Nov. 7, 2002.

(51) Int. Cl.
*G06F 19/00* (2006.01)
(52) U.S. Cl. .................... 700/245; 701/301
(58) Field of Classification Search ............ 700/245
See application file for complete search history.

(56) References Cited

U.S. PATENT DOCUMENTS

| | | | |
|---|---|---|---|
| 5,983,161 A * | 11/1999 | Lemelson et al. | |
| 6,275,773 B1 * | 8/2001 | Lemelson et al. | |
| 6,487,500 B1 * | 11/2002 | Lemelson et al. | |
| 6,553,130 B1 * | 4/2003 | Lemelson et al. | |
| 6,906,639 B1 * | 6/2005 | Lemelson et al. | |

OTHER PUBLICATIONS

Yagi et al.., Map-based navigation for a mobile robot with omnidirectional image sensor COPIS, 1995, IEEE, p. 634-648.*
Yagi et al., Estimating location and avoiding collision against unknown obstacles for the mobile robot usign omnidirectional image sensor COPIS, 1991, IEEE, p. 909-914.*
Yagi et al.., Map-based navigation for the mobile robot using omnidirectional image sensor COPIS, 1992, IEEE, p. 47-52.*
Coombs et al., Real-time obstacle aboidance using central flow divergence, and peripheral flow, 1998, IEEE, p. 49-59.*
Wilson et al. Decoding Population Codes, 2000, IEEE, p. 137-140.*
Trebub, Sparse coding of faces in a neuronal model: Interpreting cell population response in object recognition, 1997, Internet, p. 1-21.*

(Continued)

*Primary Examiner*—Thomas G. Black
*Assistant Examiner*—McDieunel Marc
(74) *Attorney, Agent, or Firm*—Ray G. Wilson; Mark N. Fitzgerald

(57) ABSTRACT

A method for allowing a robot to avoid objects along a programmed path: first, a field of view for an electronic imager of the robot is established along a path where the electronic imager obtains the object location information within the field of view; second, a population coded control signal is then derived from the object location information and is transmitted to the robot; finally, the robot then responds to the control signal and avoids the detected object.

2 Claims, 7 Drawing Sheets

OTHER PUBLICATIONS

Abbott et al., The effect of correlated variability on the accuracy of a population code, 1999, Internet, p. 1-11.*

Hafliger, What is the neural code? 2002, Internet, p. 1-8.*

Longuet-Higgins et al., "The Interpretation of a Moving Retinal Image," Proc. R. Soc. Lond. B 208, 385-397 (1990).

Nowlan et al., "A Selection Model for Motion Processing in Area MT of Primates," The Journal of Neuroscience, Feb. 1995, 15(2): 1195-1214.

Adelson et al., "Spatiotemporal Energy Models for the Perception of Motion," J. Opt. Soc. Am. A/vol. 2, No. 2, Feb. 1985, 284-299.

Perrone, "Model for the Computation of Self-Motion in Biological Systems," vol. 9, NO. / Feb. 1992, J. Opt. Soc. Am. A, 177-194.

Grzywacz et al., "A Model for the Estimate of Local Image Velocity by Cells in the Visual Cortex," Proc. R. Soc. Lond. B 239, 129-161 (1990).

* cited by examiner

| Feature | FLOPS per frame | # of Features | Total FLOPS | Interconnect Bandwidth in FLOPS |
|---|---|---|---|---|
| Stimulus FFT | 4480 | 1 | 4480 | 16384 |
| Motion Energy | 26,750 | 27,648 | 739,584,000 | 27,648 |
| Velocity | ≈1200 | 24,576 | ≈29,491,200 | 24,576 |
| Translation | ≈2400 | 288 | ≈691,200 | 288 |
| Control | ≈900 | 42 | ≈37,800 | 0 |

*FIG. 5*

VISION-BASED OBSTACLE AVOIDANCE

RELATED APPLICATIONS

This application claims the benefit of Provisional Application No. 60/424,596 filed on Nov. 7, 2002 for applicant John Galbraith.

STATEMENT REGARDING FEDERAL RIGHTS

This invention was made with government support under Contract No. W-7405-ENG-36 awarded by the U.S. Department of Energy. The government has certain rights in the invention.

REFERENCE TO COMPUTER PROGRAM LISTING APPENDIX

This application includes a computer program listing appendix submitted in duplicate on two compact discs, CD-R. The computer program listing for practicing the invention is incorporated herein in its entirety by reference. The following files reside on the compact discs:

| Name | Size | Date | |
|---|---|---|---|
| AdelsonBergen.cc | 26,845 kb | Oct. 8, 2002 | 2:40 PM |
| Camera.cc | 9,151 kb | May 11, 2002 | 2:21 PM |
| CollisionServer.cc | 4,913 kb | Oct. 10, 2002 | 3:46 PM |
| Element.cc | 1,672 kb | Sep. 26, 2002 | 11:28 PM |
| Initializer.cc | 8,474 kb | Oct. 9, 2002 | 12.42 PM |
| MotionServer.cc | 8,878 kb | Oct. 10, 2002 | 12:09 PM |
| MpegDecoder.cc | 1,674 kb | Apr. 15, 2002 | 4:52 PM |
| OpticFlowServer.cc | 14,091 kb | Aug. 20, 2002 | 12:18 PM |
| OverheadServer.cc | 8,516 kb | Oct. 14, 2002 | 1:35 PM |
| PyServer.cc | 36,626 kb | Sep. 26, 2002 | 11:06 PM |
| RotationServer.cc | 5,039 kb | Oct. 27, 2002 | 5:49 PM |
| Server-templates.cc | 3,874 kb | May 23, 2002 | 3:53 PM |
| Server.cc | 44,314 kb | Oct. 8, 2002 | 4:07 PM |
| TranslationColumn.cc | 13,515 kb | Sep. 28, 2002 | 1:04 PM |
| TranslationInitilizer.cc | 1,420 kb | May 10, 2002 | 1:40 PM |
| TranslationServer.cc | 6,440 kb | Oct. 9, 2002 | 9:53 PM |
| Variable.cc | 6,911 kb | Sep. 26, 2002 | 11:09 PM |
| VelocityColumn.cc | 13,665 kb | Oct. 8, 2002 | 11:35 PM |
| VelocityColumn.compute.cc | 4,173 kb | Oct. 31, 2002 | 1:33 PM |
| VelocityInitializer.cc | 2,053 kb | Aug. 23, 2002 | 2:59 PM |
| VelocityServer.cc | 8,318 kb | Oct. 8, 2002 | 7:45 PM |
| futaba.cc | 2,928 kb | May 16, 2002 | 3:08 PM |
| global.cc | 588 kb | Sep. 26, 2002 | 11:40 PM |
| stringUtils.cc | 3,596 kb | May 23, 2002 | 4:46 PM |
| ControlServer.py | 7,545 kb | Oct. 14, 2002 | 12:36 PM |
| DisplayMixin.py | 8,017 kb | Oct. 10, 2002 | 4:43 PM |
| DisplayServer.py | 1,067 kb | May 18, 2002 | 3:36 PM |
| InitializerServer.py | 39,712 kb | Dec. 8, 2002 | 1:34 PM |
| Locomotor.py | 3,856 kb | Oct. 14, 2002 | 3:38 PM |
| PatternStimulus.py | 21,254 kb | Sep. 26, 2002 | 10:57 PM |
| Server.py | 20,218 kb | Mar. 25, 2002 | 5:03 PM |
| StimulusServer.py | 5,865 kb | Oct. 11, 2002 | 12:13 PM |
| Variable.py | 5,016 kb | Apr. 11, 2002 | 8:23 PM |
| VideoStimulus.py | 5,716 kb | Oct. 8, 2002 | 7:50 PM |
| futaba.py | 1,739 kb | Oct. 7, 2002 | 11:43 PM |
| stimulus.py | 4,187 kb | Sep. 26, 2002 | 10:38 PM |
| video.py | 5,106 kb | Sep. 26, 2002 | 10:54 PM |
| AdelsonBergen.h | 3,394 kb | Oct. 6, 2002 | 9:06 PM |
| Camera.h | 2,598 kb | Jul. 8, 2002 | 2:24 PM |
| ComputeAtom.h | 541 kb | Apr. 25, 2002 | 2:40 PM |
| Element.h | 5,395 kb | Sep. 26, 2002 | 11:28 PM |
| Initializer.h | 1,957 kb | May 23, 2002 | 10:48 PM |
| MpegDecoder.h | 932 kb | May 11, 2002 | 2:17 PM |
| Retina.h | 1,232 kb | Apr. 22, 2002 | 2:47 PM |
| Server.h | 6,756 kb | Sep. 26, 2002 | 11:38 PM |
| Timer.h | 2,902 kb | May 24, 2002 | 8:54 PM |
| TranslationColumn.h | 3,158 kb | Aug. 19, 2002 | 2:06 PM |
| Variable.h | 7,146 kb | Sep. 26, 2002 | 10:17 PM |
| VelocityColumn.h | 3,419 kb | Oct. 8, 2002 | 9:39 PM |
| futaba.h | 451 kb | May 16, 2002 | 2:04 PM |
| global.h | 1,002 kb | Sep. 26, 2002 | 11:11 PM |
| StringUtils.h | 1,418 kb | May 23, 2002 | 4:45 PM |
| futaba.i | 623 kb | Sep. 26, 2002 | 8:36 PM |
| mylib.i | 6,956 kb | Sep. 26, 2002 | 8:45 PM |
| stimulus.i | 13,860 kb | Sep. 25, 2002 | 3:29 PM |
| video.i | 9,670 kb | Sep. 26, 2002 | 10:54 PM |
| vision.i | 47 kb | Sep. 25, 2002 | 3:29 PM |
| Makefile | 5,281 kb | Oct. 7, 2002 | 11:22 PM |
| TranslationInitializer.sh | 120 kb | May 10, 2002 | 1:41 PM |
| VelocityInitializer.sh | 139 kb | Jun. 2, 2002 | 3:04 PM |

FIELD OF THE INVENTION

The present invention relates generally to a method for robot self-control, and, more particularly, to a method and for allowing an electronic robot to perform obstacle avoidance maneuvers.

BACKGROUND OF THE INVENTION

Over the years, scientists and engineers have designed and implemented methods for machine vision and subsequent response to objects observed in the world with varying degrees of success. Some of the previous engineering methods were based on natural biological vision systems that required a mix of computer science, engineering, and physiology. Biologically inspired vision engineering is one of the most promising research areas for future successes in machine vision applications.

The performance, from an information processing point of view, of people and animals behaving in the real world greatly surpasses the current abilities of the most sophisticated engineered systems for seemingly simple tasks, including basic image understanding, robotic navigation, and obstacle avoidance. Artificial machines do not have to function like a biological system to be useful, but there is obvious evidence that biologically inspired systems actually work better for many engineering problems.

Although the potential benefits of building information processing machines that work like biological systems are clear, the technical details of how to complete such a task are not clear. This field depends on the convergence of neuroscience and engineering. Neuroscience is the field concerned with the way biological systems process information. Electrical and computer engineering is concerned with the implementation of information processing systems. The present invention demonstrates the achievement of an electronic implementation of selected contemporary neuroscience models associated with the mammalian vision system integrated into an engineered system that performs depth detection and subsequent obstacle avoidance.

A designer of a mobile, autonomous robot has many sensors available to detect obstacles and other environmental features. These detector types include sonar, laser range-finding, bump sensing, radar, infrared, and vision; to date, sonar has met with the most success. Sonar is a mature, accurate technology with moderate data processing requirements. Even some biological systems, such as a bat, use sonar for obstacle and target detection.

Despite the limited success of sonar applied to robotics, visual based processing is potentially much more useful.

Vision carries more tactical information than one dimensional technologies like sonar, because vision has higher bandwidth and a two dimensional format. Sonar, radar, and laser range-finding are essentially one dimensional technologies unless one applies additional enhancements such as scanning techniques or detector arrays. Those technologies also radiate power, resulting in fundamental limitations on sensor range and vehicle power requirements. Infrared technology is similar to vision, but it uses a different portion of the electromagnetic spectrum. Unlike vision, it also works in the dark, but can only see obstacles that radiate heat.

Vision is a superior strategy as it does not suffer from any of the above problems. Vision is passive. Sensor range is limited only by the scene and environmental factors, and power requirements are limited only by the information processing technology. Unfortunately, robotic vision requires large amounts of data processing, and engineers have not yet discovered how to extract adequate information for robot navigation, regardless of computational limitations. However, the majority of biological systems have evolved to handle the data processing requirements with tremendous success. Casual observation of humans or almost any animal will show that vision enables sophisticated, fast behavior that engineers have not duplicated in previous machines.

The present invention method involves the electronic processing of algorithms that model the neural processes that allow humans to observe objects and move around them. The emulation of biological systems as carried out by the present invention is implemented by technologies currently available, despite the fact that these technologies support limited interconnection topologies and parallelism as compared to real neural systems.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for allowing a robot to avoid objects along a programmed path. First, a field of view for an electronic imager of the robot is established along a path where the electronic imager obtains the object location information within the field of view. A population coded control signal is then derived from the object location information and is transmitted to the robot. The robot then responds to the control signal and avoids the detected object.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 5 is a table showing a rough estimate of the computation requirements required of the present invention.

DETAILED DESCRIPTION

The present invention involves the electronic processing of algorithms that model the biological processes that allow humans to observe objects in the environment and move around them. The emulation of the biological system as carried out by the present invention is implemented by technologies currently available, despite the fact that these technologies support limited interconnection topologies and parallelism as compared to real neural systems. A particular feature of real neural systems, population coding, is incorporated into the present invention as it offers unique advantages in image understanding and visual depth detection.

Information Representation and Population Coding

Neurons in biological vision systems operate primarily as feature detectors. One of the simplest feature detector neurons in the visual cortex and the first discovered by neuroscientists is a line detector. A single neuron is sensitive to a particular line with a given location on the retina, orientation, and polarity (light vs. dark).

Figure 1:
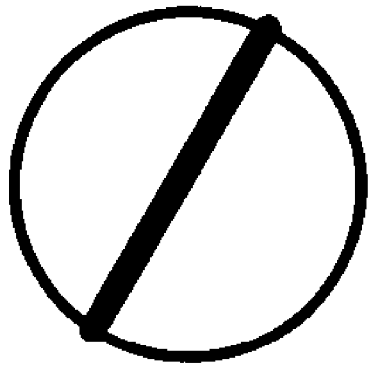
FIG. 1 is a pictorial illustration of the line features sensed by certain feature detector neurons.
Figure 1:
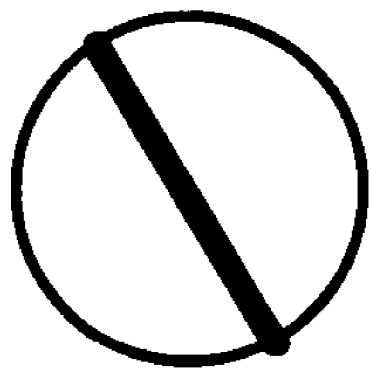
Figure 1:
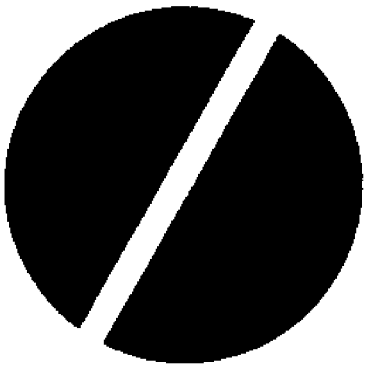
Figure 1:
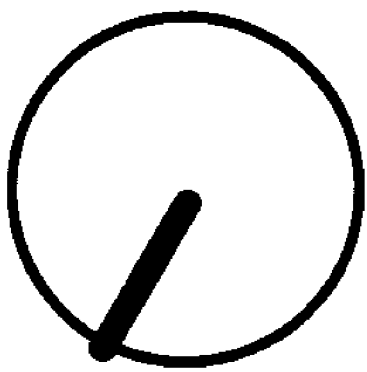

FIG. 1 displays four different lines in order to illustrate this concept. The circular outlines represent the borders of the "receptive field", or processing area, of the neuron. Each line within the circular outline is different from the other lines considering the parameters of orientation, contrast, and length. Combined with a retinotopic location, each line is detectable by a neuron. However, any particular neuron only detects one line feature of a given type; if the neuron detects the associated feature, the neuron will "activate", or output a large signal, otherwise the neuron will remain silent.

Figure 2:
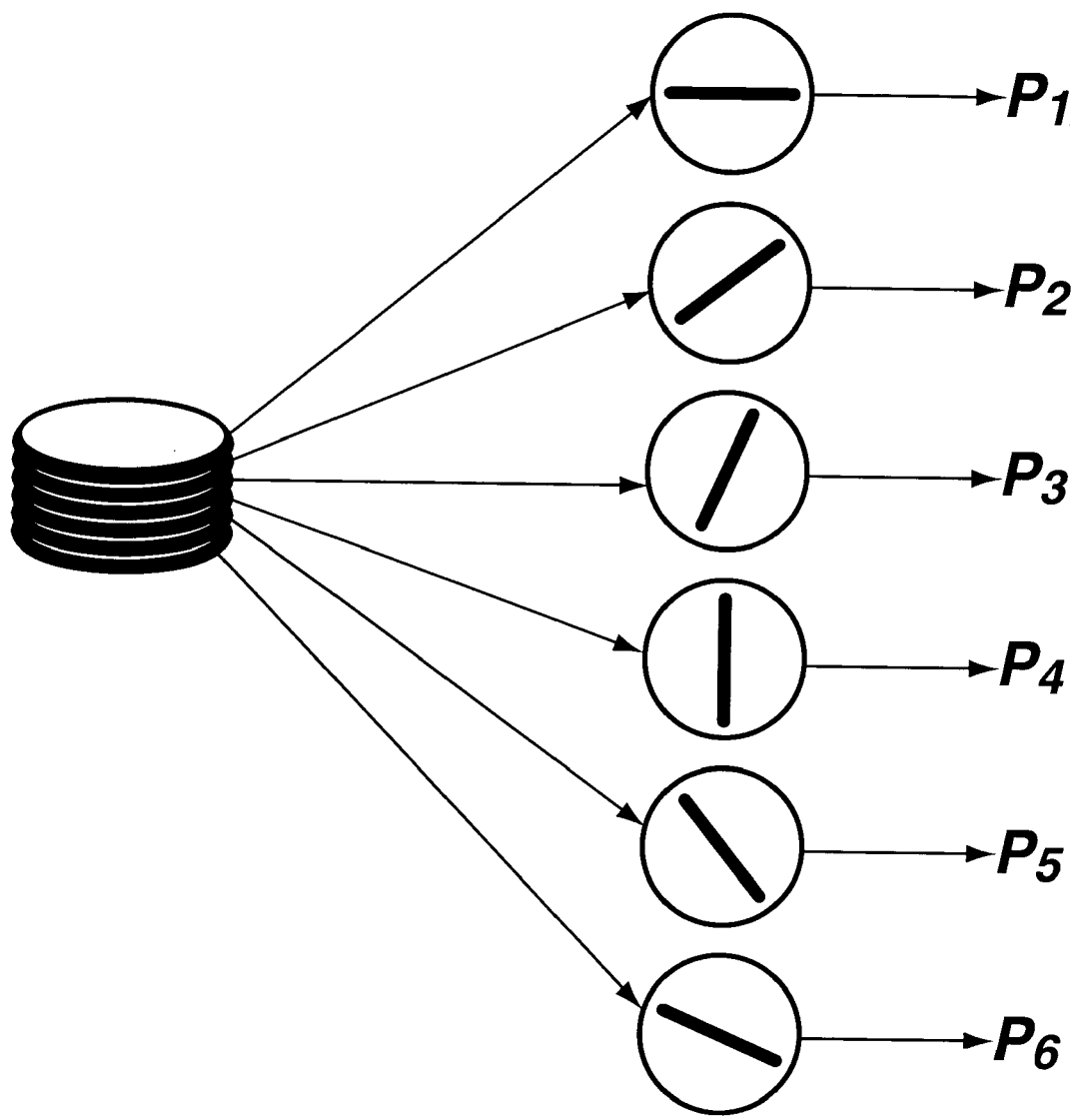
FIG. 2 is a pictorial illustration of neuron sampling in a parameter space, the resulting output yielding a population code $\vec{p} = [p_1, \ldots, p_6]$.

Referring to FIG. 2, biophysical systems, like mammals, sample a parameter space through set of "tuned" feature detector neurons, p1 thru p6. In practice, some neuron types span more than one "tuning" dimension, for example location and orientation, as is in the case of motion processing. The collection of neuron outputs is called a population code. The population code represents a quantized orientation measurement that is capable of simultaneously representing multiple tunings, like two distinct orientations at the same location.

Figure 3:
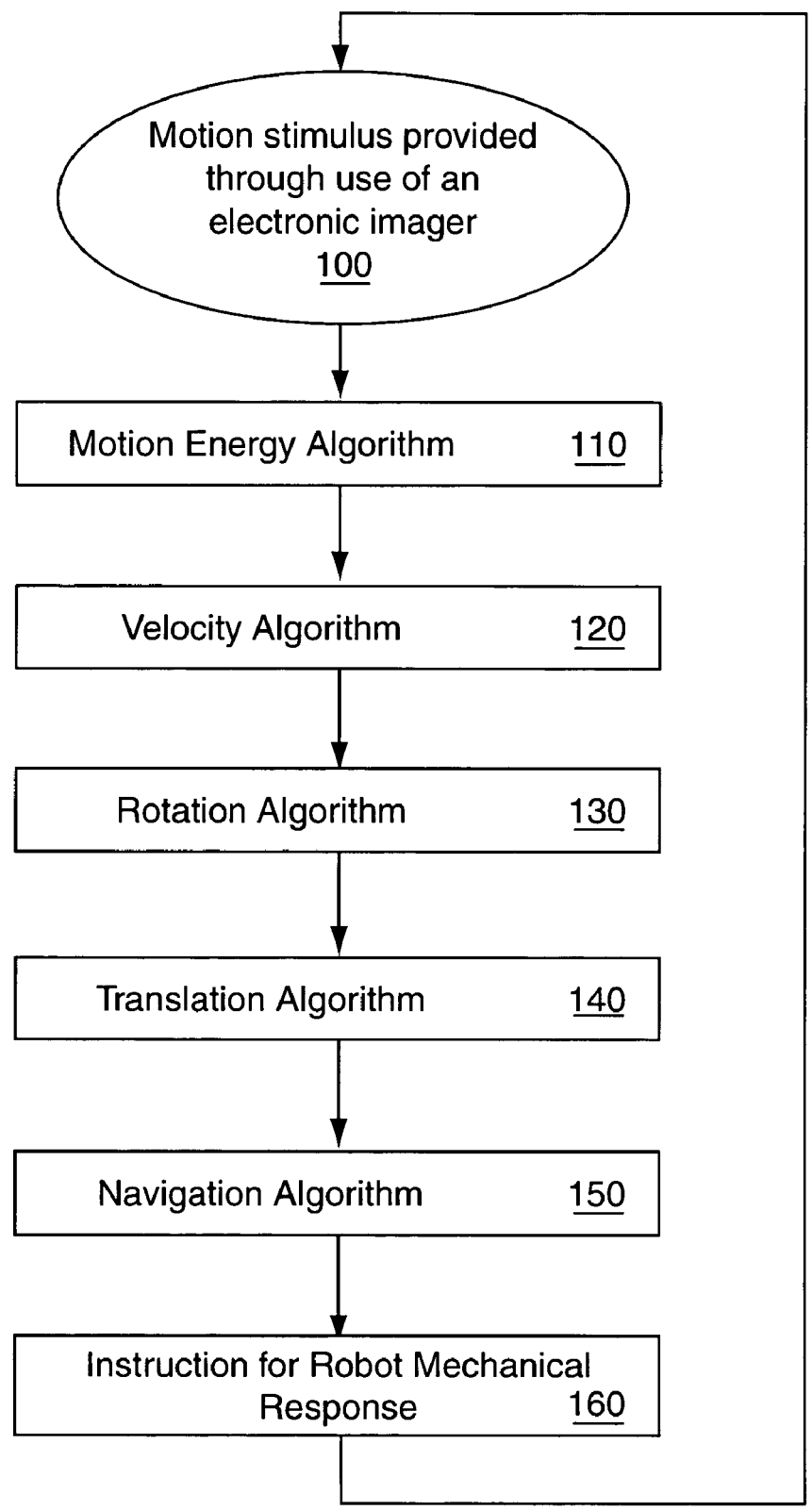
FIG. 3 is a flowchart describing the method of the present invention.

FIG. 3 is a flowchart displaying the method of the present invention. Step 100 represents an electronic imager, such as an infrared imager, charge coupled device (CCD) imager, or CMOS imager, acquiring video images of the world in the robot's field of view. The motion energy algorithm, step 110, decomposes the video stream into spatial and temporal frequency components and eliminates dependence on phase. The velocity algorithm, 120, recombines the spatial and temporal frequency components corresponding to visual objects, identifying how those objects are moving through the imager's field of view. The rotation algorithm, step 130, determines if the imager, and thus the robot, is turning left or right. The translation algorithm, step 140, reduces the velocity information produced by step 120 into a simple speed coding by eliminating the effects of rotation and the aperture problem, and calculates the distance of the object from the imager. The Navigation algorithm, step 150, comprises two parts. In the absence of obstacles, which are close objects as determined by step 140, the robot proceeds in a straight line towards some strategic goal location (programmed waypoint), solely determined by the robot's application and independent of the environment. When an obstacle appears, the second part of the navigational algorithm (tactical navigation) steers the robot in a direction away from the obstacle. In step 160, the output of step 150 is converted to a control signal that is compatible with the robot's drive motor circuits. The method is then repeated until the robot reaches the waypoint.

Algorithm Development

The method of the present invention comprises the algorithms described below that compute the distance from a robot, comprising an electronic imager, to environmental objects using the speed at which the objects move across the field of view as recognized through the aperture of the electronic imager. Close objects appear to move faster than distant objects from a reference point near the center of the image called the "focus of expansion", as disclosed in H. C Longuet-Higgins and K. Prazdny, *The Interpretation of The Moving Retinal Image*, Proceedings of the Royal Society of London B, vol. 208, 1980, incorporated herein by reference. After detecting a close object, the method of the present invention directs the robot to avoid the obstacle. The obstacle detection algorithm included in the present invention is complex because of two complicating factors: the aperture problem and rotational flow.

The aperture problem occurs because objects that move in a video stream also have a direction of movement in addition to the speed, and the direction is often hard to estimate. The speed and direction quantities are related; an error in estimating the direction corrupts the speed estimate. Certain objects in the environment, like those with long straight edges, are especially prone to ambiguous direction estimates because the object will appear to move perpendicular to the orientation of the linear feature. However, the object may actually be moving in a different direction due to the aperture problem.

Rotational image flows caused by the robot turning is the second complicating factor addressed by the algorithm. The speed of motion is directly related to the object's distance to the camera only when the direction is oriented away from the middle of the scene, a point called the focus of expansion. When the robot turns, the whole scene shifts uniformly to the right or left, and the speed of motion no longer directly indicates the distance to the object.

Motion Energy Algorithm

Any still image may be decomposed into spatial frequency components through a routine Fourier transform computation. For video images, the spatial frequency components change position (phase) with time if the object is moving. The changing position results in a temporal frequency $\psi_t$ associated with a particular spatial frequency $\psi_s$. The speed of motion, which can indicate object distance, is the ratio of the temporal frequency to the spatial frequency, $V_s = \psi_t / \psi_s$. Hence, the first step of the motion energy algorithm, as taught in E. H. Adelson and J. R. Bergen, *Spatiotemporal Energy Models for the Perception of Motion*, Journal of the Optical Society of America A, vol.2, February 1985, incorporated herein by reference, is a spatial filter that decomposes each frame of the video input S(x, y, t) into spatial frequency components, yielding a population code:

$$\xi_G(t) = S(x, y, t) * h_s(x_M, y_M, \theta_M, \psi_s) \quad \text{Equation 1}$$

where x and y are the spatial coordinates of the image, t is time, $\theta_M$ is the 2D orientation of the frequency component, and $h_s(x_M, y_M, \theta_M, \psi_s)$ is the impulse response of the filter that selects the frequency $\psi_s$, centered in the image at $(x_M, y_M)$. The convolution operation is notated by the symbol *. The spatial impulse response $h_s(x_M, y_M, \theta_M, \psi_s)$ implements an oriented bandpass characteristic, such as a Gabor filter.

Next, each spatial frequency component is decomposed into temporal frequency components with a temporal filter:

$$\xi_{Sn}(t) = \xi_G(t) * h_t(t, \psi_t) \quad \text{Equation 2}$$

The temporal impulse response $h_t(t, \psi_t)$ also implements a bandpass characteristic with center frequency $\psi_t$.

To form an "energy", the amplitude of $\xi_{Sn}(t)$ is found by eliminating the temporal oscillations that remain from the original spatial and temporal frequency characteristics of the detected object. This step requires that each filter is performed in quadrature pairs, such that four quantities result as taught in Adelson and Bergen, supra:

$$\xi_{S1}(t) = S(x,y,t) * h_s^e(x_M, y_M, \theta_M, \psi_s) * h_t^e(t, \psi_t) \quad \text{Equation 3}$$

$$\xi_{S2}(t) = S(x,y,t) * h_s^e(x_M, y_M, \theta_M, \psi_s) * h_t^o(t, \psi_t) \quad \text{Equation 4}$$

$$\xi_{S3}(t) = S(x,y,t) * h_s^o(x_M, y_M, \theta_M, \psi_s) * h_t^e(t, \psi_t) \quad \text{Equation 5}$$

$$\xi_{S4}(t) = S(x,y,t) * h_s^o(x_M, y_M, \theta_M, \psi_s) * h_t^o(t, \psi_t) \quad \text{Equation 6}$$

where $h_s^e$ and $h_s^o$ are the even and odd components of a quadrature, bandpass, spatial filter tuned to orientation $\theta_M$ and spatial frequency $\psi_s$, and $h_t^e(t, \psi_t)$ and $h_t^o(t, \psi_t)$ are the even and odd components of a quadrature, bandpass, temporal filter tuned to the temporal frequency $\psi_t$. Finally, the nonlinear combination $$\xi_M(t, \Omega_M) = [\xi_{S1}(t) + \xi_{S4}(t)]^2 + [\xi_{S2}(t) - \xi_{S3}(t)]^2 - [\xi_{S1}(t) - \xi_{S4}(t)]^2 - [\xi_{S2}(t) + \xi_{S3}(t)]^2 \quad \text{Equation 7}$$

represents the population coded motion energy, Adelson and Bergen, supra. Thus, all of the tuning parameters are represented by the set $\Omega_M = \{x_M, y_M, \theta_M, \psi_t\}$.

The motion energy output is a large set of individual feature detectors, with each feature detector $\xi_M(t, \Omega_M)$ sensitive to, or "tuned", to a particular value of spatial frequency $\psi_s$, spatial orientation $\theta_M$, temporal frequency $\psi_t$, and image location $(x_M, y_M)$.

The motion energy algorithm is incorporated into the computer code used to practice the present invention through modules AdelsonBergen.cc and MotionServer.cc which are included in the appendix.

Velocity Algorithm

The velocity speed $v_s$ of a spatial component is computed from the motion energy output as the ratio of the component's temporal frequency $\psi_t$ divided by the component's spatial frequency $\psi_s$. Summing motion energy features with similar velocity speeds and orientations recombines the spatial frequency components into complex objects, each with known velocity as taught in N. M. Grzywacz and A. L Yuille, *A Model for the Estimate of Local Image Velocity by Cells in the Visual Cortex*, Proceedings of the Royal Society of London B, vol. 239, 1990, incorporated herein by reference. In addition to speed, velocity $v_s$ is tuned to orientation $\theta_V$ and image location $(x_M, y_M)$. The whole tuning set is notated $\Omega_V = \{x_M, y_M, v_s, \theta_v\}$.

As discussed previously, motion energy is susceptible to the aperture problem. The velocity computation used here accounts for the aperture problem by computing velocity for all the possible motion energy orientations $\theta_M$ as displayed in FIG. 2, not just the single orientation perpendicular to linear features. This capability is made possible by the use of population coding, which allows multiple velocity estimates to exist together. Generally, the velocity orientation $\theta_V$ is similar to the motion energy orientation $\theta_M$ when the aperture problem is not a factor, but the two quantities diverge as the aperture problem grows. The terms that include $\cos(\theta_M - \theta_v)$ in the following equations implement this divergence.

Each velocity feature of the population code $\xi_V(t, \Omega_V)$ is the composite sum of the spatial frequency components $\xi_M(t, \Omega_M)$ that have similar orientation and velocity speed to the velocity tuning, $v_S$ and $\theta_V$. The corresponding summation is $$\xi_V(t,\Omega_V) = \Sigma W_V(\Omega_M, \Omega_V) \xi_M(t,\Omega_M) \qquad \text{Equation 8}$$

with the velocity weights $$W_V(\Omega_M \Omega_V) = \frac{H_s^2(f_x = \psi_t \cos(\theta_M) / [v_s \cos(\theta_M - \theta_v)],}{\sum_{\Omega_M} W_V(\Omega_M, \Omega_V)} \qquad \text{Equation 9}$$
$$f_y = \psi_t \sin(\theta_M)/[v_s \cos(\theta_M - \theta_v)])$$
$$H_t^2(f_t = v_s/[\cos(\theta_v - \theta_M)\psi_s])$$

where $f_x$, $f_y$, and $f_t$ are the frequency variables corresponding to x, y and t in the frequency domain representation of the spatial and temporal impulse response functions $H_s(f_x, f_y)$ and $H_t(f_t)$. The output of the velocity stage is a population code of individual features $\xi_v(t, \Omega_v)$, each tuned to a particular image location $(x_M, y_M)$, velocity speed $v_s$, and velocity orientation $\theta_v$.

In practice, the velocity features $\xi_v(t, \Omega_v)$ are tuned too broadly in velocity speed $v_s$. The expansive normalization, as taught in S. J. Nowlan and T. J. Sejnowski, *A Selection Model for Motion Processing in Area MT of Primates*, The Journal of Neuroscience, vol. 15, February 1995, incorporated herein by reference, results in the following inhibited velocity equation:

$$\xi_{VI}(t, \Omega_V) = e^{\alpha_v \xi_v(t,\Omega_v)} / \sum_{V_s} e^{\alpha_v \xi_v(t,\Omega_v)} \qquad \text{Equation 10}$$

that implements mutual inhibition and normalization. This step narrows the velocity tuning characteristics of the plain velocity features with the parameter $\alpha_v$, which is empirically determined, setting the amount of mutual inhibition.

The velocity algorithm is incorporated into the computer code used to practice the present invention through modules VelocityColumn.cc, VelocityColumn.compute.cc, VelocityInitializer.cc, and VelocityServer.cc, which are included in the appendix.

Rotation Algorithm

When the robot turns, global velocity flows occur that are equal in magnitude across the whole image as disclosed in J. A. Perrone, *Model for the Computation of Self-motion in Biological Systems*, Journal of the Optical Society of America A, vol.9, 1992, incorporated herein by reference. These flows corrupt the relationship between the velocity speed $v_s$ and the distance to the object in the world. The first step in compensating for rotation is estimating the magnitude of the rotational flow R by computing a new population code $\xi_R(t,R)$. Because rotational flow is constant across the image, the rotational features detect horizontally oriented velocities $\theta_v \approx 0$ or $\theta_v \approx \pi$ with similar velocity speed tunings $v_s$ across the whole image:

$$\xi_R(t, R) = \sum_{\theta_V} W_R(\Omega_V, R) \xi_{VI}(t, \Omega_V) \qquad \text{Equation 11}$$

where the rotation weights $$W_R(\Omega_V, R) = W_{RH}(R, v_s, \theta_V)[W_{RF}(x_M, y_M) + W_{RT}(\theta_T, \theta_V)] \qquad \text{Equation 12}$$

pick the horizontally oriented velocity features with the term $$W_{RH}(R, v_s, \theta_V) = e^{-1/2[(R - V_s)/\sigma_R]^2} \text{ for } \theta_V \in \{0, \pi\} \qquad \text{Equation 13}$$

or zero otherwise where $\alpha_R$ determines the spread of velocity speeds around rotational flow R.

A pair of useful optional enhancements to the rotational weights are, first $$W_{RT}(\theta_T, \theta_V) = 1 - e^{-1/2[(\theta_T - \theta_V)/\sigma\theta]^2} \qquad \text{Equation 14}$$

that discounts particular rotational flows that might not be from the robot turning, but from the useful flow that indicates distance to an object. In this term, $\theta_T$ is the orientation that results from the robot approaching an object without turning that points directly away from the focus of expansion near the center of the image. Hence, the $W_{RT}$ term eliminates velocity features from the rotation algorithm that cannot be distinguished between flow from an approaching object and flow from rotation. The term $\sigma_\theta$ determines the separation between the $\theta_T$ and $\theta_V$ required for the $W_{RT}$ term to be included in the rotation features.

The second enhancement, $$W_{RF}(x_M, y_M) = e^{-1/2[(x_M^2 + y_M^2)/\sigma_{RF}^2]} \qquad \text{Equation 15}$$

emphasizes the region in the center of the image (around the focus of expansion) that results from rotational flow and never from an approaching object. The size of the region free of parallax induced motion is indicated by $\sigma_{RF}$.

The rotation algorithm is incorporated into the computer code used to practice the present invention through the module RotationServer.cc, which is included in the appendix.

Translation Algorithm

The translation algorithm eliminates the adverse effects of the aperture problem and rotational flow. The distance to an object is coded in the speed that the object appears to move in the direction opposite the focus of expansion $\theta_T$. This speed is called the translation speed $v_t$, where the translation orientation is $\theta_T = a \tan(y_M/x_M)$. Thus, the translation orientation is a fixed angle that is computed from the relationship of the image position and the focus of expansion and is not an independent tuning variable. The population coded translation features $$\xi_T(t, \Omega_T) = \sum_{\Omega_{V,R}} W_T(\Omega_V, R, \Omega_T)\xi_{VI}(t, \Omega_V)\xi_R(t, R) \quad \text{Equation 16}$$

subtract the rotational estimate R from the inhibited velocity features $\xi_{VI}(t,\Omega_V)$, and align their orientations from $\theta_V$ to $\theta_T$ according to the weights $$W_T(\Omega_V, R, \Omega_T) = e^{-1/2[|(\vec{C}-\vec{T}-\vec{R})/\sigma_C|]^2} \quad \text{Equation 17}$$

where $\vec{T} = v_t \angle \theta_t$ is the corrected vector, $\vec{R} = R \angle 0$ is the horizontal flow vector resulting from rotation, $\vec{C} = v_s \angle \theta_v$ is the uncorrected velocity vector tuning, and $\sigma_c$ defines the range of velocity feature tunings that contribute to the translation features $\xi_T(t,\Omega_T)$.

The subtraction of $\vec{R}$ accommodates rotational flow, and the alignment resolves the aperture problem. This operation takes advantage of the fact that the velocity features include all the velocity vectors consistent with the aperture problem, choosing the subset of activated velocity features closest in tuning to the vector $\vec{T}$. The translation stage output is a set of features tuned to $\Omega_T = \{x_M, y_M, v_T\}$.

The translation features $\xi_T(t,\Omega_T)$ are equivalent to distance detectors if one considers the distance tuning as $D = \sqrt{x_M^2 + y_M^2}/V_T$ and the focus of expansion at $x=y=0$. Hence, the translation detectors $\xi_T(t,\Omega_T)$ may be interpreted to indicate the "time to collision", or distance, between the electronic imager and an object in the environment.

The translation algorithm is incorporated into the computer code used to practice the present invention through the modules TranslationColumn.cc, TranslationServer.cc, TranslationInitializer.cc, and CollisionServer.cc, which are included in the appendix.

Navigation Algorithm

Navigation consists of two complimentary functions. First, the robot must be programmed to go somewhere different than the robot's current location. Often, this primary "strategic" goal is a programmed waypoint that the robot must reach to deliver a payload object, take a picture, or achieve some other application specific purpose; without such a goal, the robot has no motivation to move at all. The secondary "Tactical" goal is to avoid collisions along the way. Thus, the obstacle avoidance task, implemented by the present invention, is independent of the robot's strategic goal.

As the robot moves forward, several options are available at any given time. The robot may maintain the current heading or the robot may turn left or right. When turning, the robot may turn in varying speeds. The turn rate $R_C$ varies from −1, that represents the fastest left turn, to +1, that represents the fastest right turn. A turn rate of zero indicates no turn. The strategic control vector $\xi_{CW}(t,R_C)$ is a population coded representation of $R_C$.

Tactical Navigation

The present invention demonstrates the tactical goal of obstacle avoidance. The result $\xi_T(t,\Omega_T)$ indicates the distance to various objects in the scene. The tactical control vector $$\xi_{CA}(t, R_C) = \sum_{\Omega_T} W_R(\Omega_T, R_C)\xi_T(t, \Omega_T) \quad \text{Equation 18}$$

picks new directions by pointing the robot at distant objects as represented in $\xi_T(t,\Omega_T)$ according to the weights $$W_A(\Omega_T, R_C) = W_{AX}(R_C, x_M)W_{AD}(D)W_{AFOE}(x_M, y_M). \quad \text{Equation 19}$$

The factor $W_{AX}(R_C, x_M)$ chooses a course correction $R_C$ to steer away from detected obstacles in the region $\sigma_x$ around $x_M$:

$$W_{AX}(R_C, x_M) = e^{-[(R_X(R_C-1)-x_M)/\sigma_X]^2} \text{ for } 1 \geq R_C > 0, \text{ and} \quad \text{Equation 20}$$
$$e^{-[(R_X(R_C+1)-x_M)/\sigma_X]^2} \text{ for } -1 \leq R_C \leq 0$$

where $R_X$ is the number of pixels to the edge of the stimulus from the focus of expansion near the center of the image. The expressions $R_X(R_C-1)$ and $R_X(R_C+1)$ scale Rc to the same units as the horizontal pixel coordinate $x_M$. Obstacles detected horizontally near the focus of expansion ($x_M \approx 0$) generate strong course corrections in contrast to obstacles near the scene periphery that cause only minor adjustments. The distinction between positive and negative $R_C$ determines the corresponding behavior for right and left turns.

The term $$W_{AD}(D) = 1 - [(D - \min(D))/(\max(D) - \min(D))] \quad \text{Equation 21}$$

emphasizes close objects, so the nearest obstacle is avoided first.

The region around the focus of expansion at the center of the image does not provide good distance estimates, so $$W_{AFOE}(x_M, y_M) = 0 \text{ for } |x_M| < 10, |y_M| < 20, \text{ and } 1 \text{ elsewhere} \quad \text{Equation 22}$$

discounts those inputs.

Combined Navigation

Usually, the course towards the strategic goal, indicated by $\xi_{CW}(t,R_C)$, and the course that best avoids obstacles, indicated by $\xi_{CA}(t,R_C)$, are different. At any given time, one course or the other must be chosen. Generally, $\xi_{CW}(t,R_C)$ is the default behavior guiding the robot towards a useful goal. However, when an obstacle lies in between the robot and the waypoint, the tactical course $\xi_{CA}(t,R_C)$ necessarily takes priority as the obstacle is avoided. The two control vectors are combined as $$\xi_C(t, R_C) = \frac{e^{\alpha_C[\xi_{CW}(t,R_C) + \beta_C \xi_{CA}(t,R_C)]}}{\sum_{R_C} e^{\alpha_C[\xi_{CW}(t,R_C) + \beta_C \xi_{CA}(t,R_C)]}} \quad \text{Equation 23}$$

to implement the joint behavior. The empirically determined parameter $\beta_C$ determines the threshold at which $\xi_{CA}(t,R_C)$ takes the priority, and $\alpha_C$ implements mutual inhibition such that one and only one course $R_C$ dominates at any given time.

At the end of the algorithmic processing, the population coded control vector $\xi_C(t,R_C)$ is converted from a population code to a single scalar number $$C_T(t) = \sum_{R_C} \xi_C(t, R_C) R_C \Big/ \sum_{R_C} \xi_C(t, R_C) \qquad \text{Equation 24}$$

that is used as a control signal.

The navigation algorithm is incorporated into the computer code used to practice the present invention through the module ControlServer.py, which is included in the appendix.

EXAMPLE

Hardware Design Features

Figure 4:
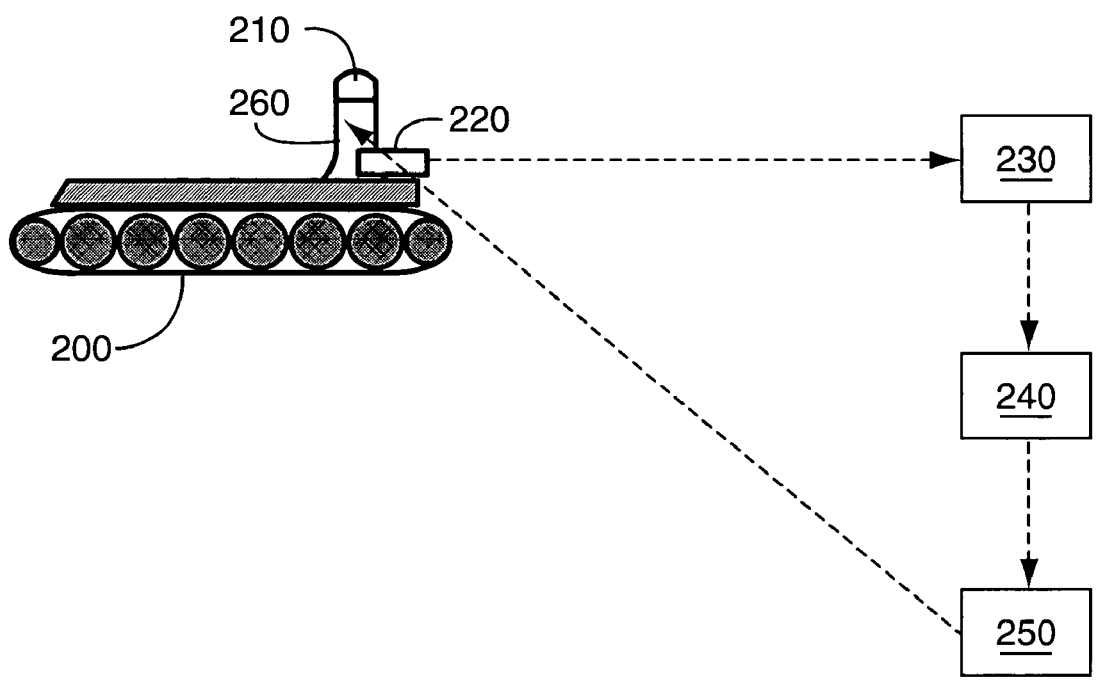
FIG. 4 is a pictorial illustration of the robot used to practice the present invention.

Referring to FIG. 4, in order to practice the method of the present invention, a hardware system comprising the following physical components was assembled: remote control robotic chassis 200, electronic imaging device 210, video transmitter 220, video receiver 230, digital multiprocessor computer 240, control radio transmitter 250, and control radio receiver 260.

Robotic chassis 200 was a small remote control model tank, just large enough to support the required payload of a few pounds. The model tank's control system, supplied with the model, included two drive motors, radio receiver 260 of a type used by model airplanes, an electronic circuit to convert servo commands received from receiver 260 into motor control signals, and two rechargeable batteries that powered receiver 260 and the drive motors. The original tank model was stripped of its cosmetic accessories to make room for an aluminum platform upon which the custom image acquisition and video transmission hardware was mounted.

Radio transmitter 250 used with chassis 200 was designed for manual operation. In this application, computer based control was achieved using a "trainer" feature of the radio. Normally, the trainer port accepts electronic commands from a second radio transmitter, often in the hands of a student pilot. For this demonstration, however, a custom circuit was substituted for the student's radio, which translated automatic commands from digital multiprocessor computer 240 into the electronic format compatible with the trainer port.

Electronic imaging device 210, a common CCD camera, was mounted on an aluminum post at the rear of chassis 200. The post mounting hardware allowed for coarse adjustment of the vertical and horizontal view angles of electronic imaging device 210 to ensure the focus of expansion (focal plane) was approximately at the center of the acquired imagery. There was no active control of electronic imaging device 210 orientation; once set, electronic imaging device 210 always pointed straight forward. Electronic imaging device 210 was mounted at the back of chassis 200 to reduce the possibility of objects leaving the field of view before they were safely avoided; this reduces the possibility of "body clipping", a problem that occurs if electronic imaging device 210 is mounted forward on chassis 200, which results in an identified obstacle being forgotten by the computer program before the rear of the chassis 200 clears the obstacle, often resulting in a collision. The body clipping problem was reduced by mounting electronic imaging device 210 on the back of chassis 200.

Image transmission was performed with inexpensive wireless video transmitter 220 and video receiver 230. Electronic imaging device 210 produced a video signal compatible with video transmitter 220, and digital multiprocessor computer 240 recorded the output from video receiver 230 using a framegrabber accessory designed for video and television applications. The video transmission occurred with completely separate apparatus and frequency from the motor control radio. Electronic imaging device 210 and video transmitter 220 were powered with a rechargeable battery (not shown) mounted on robotic chassis 200.

Digital multiprocessor computer 240 comprised a cluster of sixteen 933 MHz Pentium-III processors, interconnected with 100 MBit ethernet, running the GNU/Linux operating system.

Software Design Features

The method of the present invention, as implemented in software, required more computer power than a single processor could provide for real time performance and control, thus, multiple processors were used. FIG. 5 is a table showing a rough estimate of the computational requirements of the present invention. The estimates add up to about 770 million floating point operations per frame (FLOPS). The overall computer computation ran at about 11 frames per second, for a total computational throughput of about 8.5 billion floating point operations per second. The column labeled "Interconnect Bandwidth" is the number of FLOPS that traveled to the next algorithm process over the ethernet that connected the multiple processors.

In order to take advantage of multiprocessing, each of the stages described above were implemented as a distinct computational process. Together, the processes implemented the method displayed in FIG. 3, with each process working on a whole timestep of data at a time. Following the method, each process worked on a different timestep relative to the others. Each stage of data assimilation used a whole frame to transfer between processes during which it was not otherwise involved in computation. Thus, processing the method achieved high throughput, but also generated several frames of latency between the time an image was captured and that frame influenced the navigational behavior in the Control module. In practice, the software ran at a rate of 11 frames per second, and the latency was about 1 second.

The stages of "Rotation", "Translation", "Collision", and "Control", each executed on a single processor. In some cases, processors were shared between these tasks if they ran fast enough. The "Motion" and "Velocity" stages were too large to execute on a single processor in real time, therefore, multiple processors were used for those individual tasks.

Many commonly available "open source" software modules were used in the implementation of the software. The software code used in this example of the present invention was written in the C++ language, using the Blitz++ library to support large multi-dimensional arrays. For message passing between processors, the LAM implementation of the MPI standard was used. The smaller processes were implemented in the Python language, using the Numerical Python extensions to implement arrays. Data was logged by a dedicated process using the NetCDF protocol and associated library. All of the original software code modules used to practice the present invention are located in the attached computer program listing appendix. Modules with the "cc" extension are in the C++ language. Modules with a "py" extension are in the Python language.

Test Run of Robot on Obstacle Course

The primary goal of the robot using the method of the present invention was to program the robot to follow a waypoint specified course that included obstacles. Waypoint finding is a useful goal which in real applications is easily implemented using the Global Positioning System (GPS).

Figure 6:
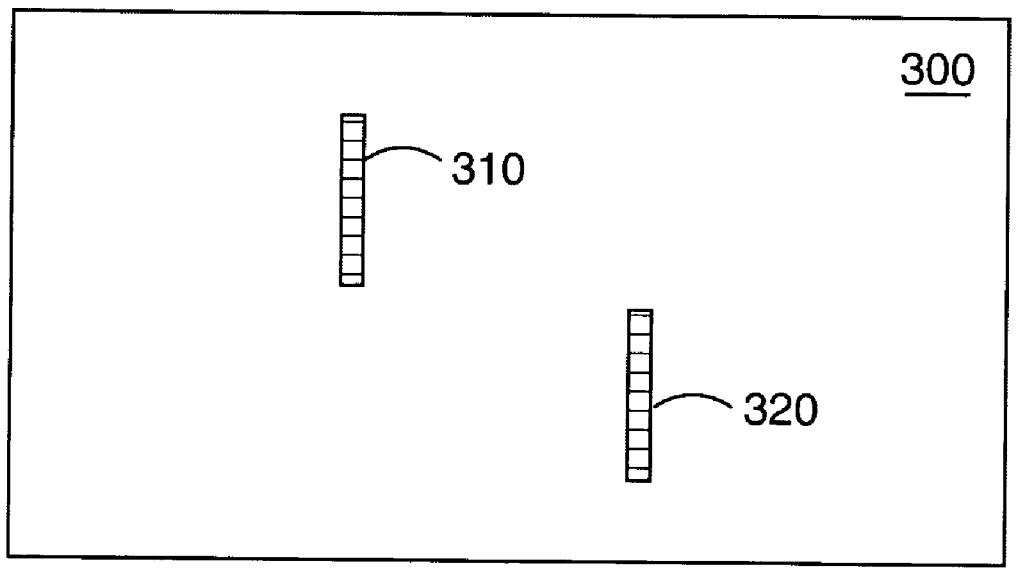
FIG. 6 is a pictorial illustration of the experimental arena.
Figure 7:
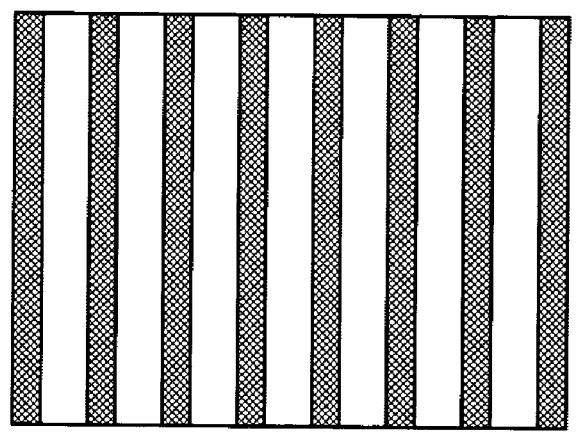
FIG. 7 is a pictorial illustration of the pattern place on obstacles within the experimental arena.
Figure 8:
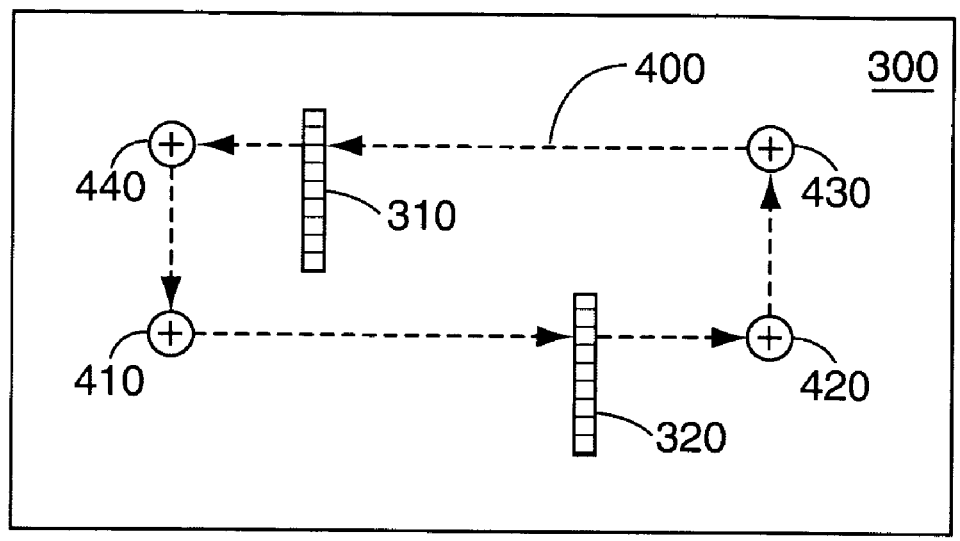
FIG. 8 is a pictorial illustration of the pre-programmed waypoint path of the robot using the method of the present invention.

FIG. 6 is a diagram of experimental arena 300. Obstacles 310 and 320 were placed within experimental arena 300 as shown. FIG. 7 displays the pattern placed on obstacles 310, 320 for the imager to detect. As shown, obstacles 310, 320 exhibited a line pattern perpendicular to the floor of experimental arena 300. The robot was pre-programmed to travel between the waypoints (strategic navigation) in square path pattern 400 as shown in FIG. 8 by the four marked waypoints 410, 420, 430, and 440.

Figure 9:
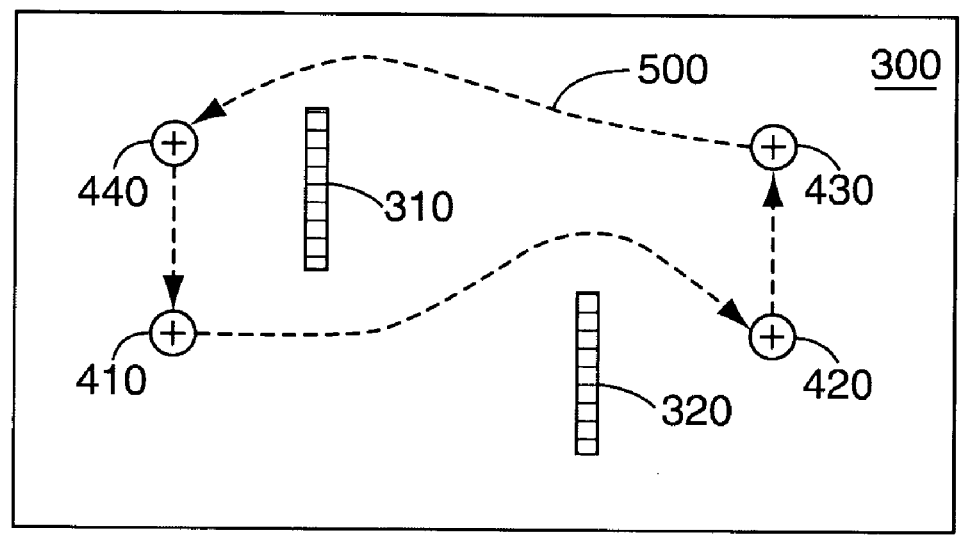
FIG. 9 is a pictorial illustration showing the path of the robot while practicing the method of the present invention.

FIG. 9 shows path 500 that the robot took along the programmed waypoint path. Obstacle location information was contained in the translation algorithm, $\xi_T(t,\Omega_T)$. The translation information was integrated within the navigational algorithm, $\xi_C(t,R_C)$.

The result demonstrated herein is novel in the ability to handle more complex environments than previous autonomous robot works using only vision derived input. This test demonstrates for the first time the use of population coded time-to-collision features that were used as sensory input into a population coded control model. The experimental results were novel in the size and speed of the simulation and complexity of the real world arena. The obstacles were successfully avoided using vision alone with autonomy demonstrated by the robot.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for avoiding objects along a path programmed into a robot comprising the following steps in the order named:
   (a) establishing a field of view for an electronic imager of said robot along said path,
   (b) obtaining object location information in said field of view,
   (c) deriving a population coded control signal from said object location information by,
      processing a population coded motion energy algorithm that decomposes a video stream of said object location information into spatial and temporal frequency components,
      processing a population coded velocity algorithm that recombines said spatial and temporal frequency components corresponding to said object and provides a velocity output, thereby identifying how said object is moving in said field of view,
      processing a population coded rotation algorithm that determines if said electronic imager is turning and provides a turning information output,
      processing a population coded translation algorithm that transforms said velocity output of said velocity algorithm into a speed signal and calculates a distance between said object and said electronic imager providing a strategic control vector and a tactical control vector,
      processing a population coded navigation algorithm where said strategic control vector, said tactical control vector, and said turning information output are used to derive said population coded control signal, and
   (d) transmitting said population coded control signal to said robot, thereby allowing said robot to avoid said object.

2. A method for deriving a distance from an object to an electronic imager comprising the following steps in the order named:
   (a) establishing a field of view for said electronic imager,
   (b) obtaining object location information in said field of view,
   (c) deriving said distance from said object to said electronic imager by,
      processing a population coded motion energy algorithm that decomposes a video stream of said object location information into spatial and temporal frequency components,
      processing a population coded velocity algorithm that recombines said spatial and temporal frequency components corresponding to said object and provides a velocity output, thereby identifying how said object is moving in said field of view, and
      processing a population coded translation algorithm that transforms said velocity output of said velocity algorithm into a speed signal and calculates said distance between said object and said electronic imager.

* * * * *